United States Patent [19]
Gaetner et al.

[11] Patent Number: 5,452,452
[45] Date of Patent: Sep. 19, 1995

[54] SYSTEM HAVING INTEGRATED DISPATCHER FOR SELF SCHEDULING PROCESSORS TO EXECUTE MULTIPLE TYPES OF PROCESSES

[75] Inventors: Gregory G. Gaetner; George A. Spix; Diane M. Wengelski; Keith J. Thompson, all of Eau Claire, Wis.

[73] Assignee: Cray Research, Inc., Eagan, Minn.

[21] Appl. No.: 72,655

[22] Filed: Jun. 4, 1993

Related U.S. Application Data

[63] Continuation of Ser. No. 571,952, Aug. 23, 1990, abandoned, which is a continuation-in-part of Ser. No. 537,466, Jun. 11, 1990, Pat. No. 5,179,702.

[51] Int. Cl.⁶ .................................................. G06F 9/46
[52] U.S. Cl. ............................. 395/650; 364/DIG. 1; 364/230.1; 364/230.2; 364/230.3; 364/281.3; 364/281.8
[58] Field of Search .......................................... 395/650

[56] References Cited

U.S. PATENT DOCUMENTS

| | | | |
|---|---|---|---|
| 4,286,322 | 8/1981 | Hoffman et al. | 395/650 |
| 4,316,245 | 2/1982 | Luu et al. | 395/650 |
| 4,394,727 | 7/1983 | Hoffman et al. | 395/650 |
| 4,727,487 | 2/1988 | Masui et al. | 395/67 |
| 4,794,526 | 12/1988 | May et al. | 395/650 |
| 4,897,780 | 1/1990 | Lakness | 395/425 |
| 4,908,750 | 3/1990 | Jablow | 395/650 |
| 4,985,831 | 1/1991 | Dulong et al. | 395/650 |
| 5,012,409 | 4/1991 | Fletcher et al. | 395/650 |
| 5,057,996 | 10/1991 | Cutler et al. | 395/650 |
| 5,109,512 | 4/1992 | Bahr et al. | 395/650 |
| 5,293,620 | 3/1994 | Barabash et al. | 395/650 |

*Primary Examiner*—Krisna Lim
*Attorney, Agent, or Firm*—Schwegman, Lundberg & Woessner

[57] ABSTRACT

Method for enabling each of several processors in a multi-processing operating system to schedule processes it will execute without a supervisory scheduler. The processes are executed on the basis of priorities assigned to the processes. More than one processor can schedule processes simultaneously so long as each processor schedules processes having different priority levels from those being processed by another processor.

4 Claims, 4 Drawing Sheets

SYSTEM HAVING INTEGRATED DISPATCHER FOR SELF SCHEDULING PROCESSORS TO EXECUTE MULTIPLE TYPES OF PROCESSES

RELATED APPLICATIONS

This is a continuation of application Ser. No. 07/07/571,952 filed Aug. 23, 1990, and now abandoned, which application is a continuation-in-part of Ser. No. 07/537,466 filed Jun. 11, 1990 now U.S. Pat. No. 5,179,702, issued on Jan. 12, 1993, entitled INTEGRATED SOFTWARE ARCHITECTURE FOR A HIGHLY PARALLEL MULTIPROCESSOR SYSTEM, and assigned to the assignee of the present invention, the disclosure of which is hereby incorporated by reference in the present application. The application is also related to copending applications entitled, DISTRIBUTED ARCHITECTURE FOR INPUT/OUTPUT FOR A MULTIPROCESSOR SYSTEM, U.S. Pat. No. 5,239,629, issued on Aug. 24, 1993 METHOD AND APPARATUS FOR A LOAD AND FLAG INSTRUCTION, Ser. No. 08/173,923, filed on Dec. 28, 1993 which is a file wrapper continuation of Ser. No. 07/920,155, filed on Jul. 23, 1992, now abandoned, which is a file wrapper continuation of Ser. No. 07/536,217, filed on Jun. 11, 1990, now abandoned, and SIGNALING MECHANISM FOR A MULTIPROCESSOR SYSTEM, U.S. Pat. No. 5,239,629, issued on Aug. 24, 1993. The application is also related to copending application filed concurrently herewith, entitled DUAL LEVEL SCHEDULING OF PROCESSES TO MULTIPLE PARALLEL REGIONS OF A MULTITHREADED PROGRAM ON A TIGHTLY COUPLED MULTIPROCESSOR COMPUTER SYSTEM, U.S. Pat. No. 5,339,415, issued on Aug. 16, 1994, METHOD OF EFFICIENT COMMUNICATION BETWEEN COPROCESSORS OF UNEQUAL SPEEDS U.S. Pat. No. 5,202,988, issued on Apr. 13, 1993 and METHOD OF IMPLEMENTING KERNEL FUNCTIONS USING MINIMAL CONTEXT PROCESSES, U.S. Pat. No. 5,390,329, issued on Feb. 14, 1995, all of which are assigned to the assignee of the present invention, the disclosures of which are hereby incorporated by reference in the present application.

TECHNICAL FIELD

The present invention relates generally to multiprocessor computer systems and specifically to allocating processors in a tightly-coupled configuration to execute the threads of one or more multithreaded programs that are running on the system simultaneously.

BACKGROUND ART

Processes are entities that are scheduled by the operating system to run on processors. In a multithreaded program, different threads may execute simultaneously on different processors. If the processes executing the different threads of a program are scheduled to execute simultaneously on different processors, then multiprocessing of the multithreaded program is achieved. In addition, if multiple system processes are scheduled to run simultaneously on multiple processors, the operating system has achieved multiprocessing.

Generally, in all process scheduling at least four types of contenders compete for processor access:
1) Processes waking up after waiting for an event;
2) Work needing to be done after an interrupt;
3) Multiple threads in the operating system;
4) Multiple threads in user processes.

One problem with existing implementations of multithreaded systems is that a bottleneck occurs when multiple threads must wait at a final, central point to be dispatched to a processor. This scheme may use a lock manager to schedule processes. The result requires a process to wait in line for a processor. Inefficient scheduling may occur if a lower priority process is in the queue ahead of a higher priority process. Thus, the result of the lock manager is to reduce a multithreaded process into a single thread of execution at the point where processes are dispatched.

Another problem related to existing implementations is that efficiency is reduced because of overhead associated with processes. In a classical Unix TM [1] implementation, only one kind of process entity can be created or processed. A process consists of system side context and user side context. Because a classical Unix implementation has only one creating entity, the fork, the system processes contain more context information than is actually required. The user context (i.e. user block and various process table fields) is ignored by the system and not used. However, this context has overhead associated with memory and switching which is not ignored and thus consumes unnecessary resources.

1. Unix is a trademark of AT&T Bell Laboratories

Another problem with existing implementations is that when an interrupt occurs, the processor which receives the interrupt stops processing to handle the interrupt, regardless of what the processor was doing. This can result in delaying a high priority task by making the processor service a lower priority interrupt.

Another problem can occur when an implementation has multiple schedulers in a tightly coupled multiprocessing environment. Each of the schedulers controls a type of process and as such all schedulers are in contention for access to processors. Decentralizing the run queue function has overhead penalties for the complexity in managing locally scheduled processes.

SUMMARY OF THE INVENTION

This invention relates to the scheduling of multiple computing resources between multiple categories of contenders and the efficient use of these computing resources. In particular it relates to the scheduling of multiple, closely-coupled computing processors.

The scheduling method, herein after referred to as an integrated dispatcher, improves the efficiency in scheduling multiple processors by providing a focal point for scheduling. That is, there are not independent schedules for each category of processes to be scheduled. This ensures that the highest priority process will be scheduled regardless of its type. For example, if schedulers were independent, a processor running the interrupt process scheduler would choose the highest priority process from the interrupt process running, even though there may be higher priority processes waiting on a different scheduler's run queue. The integrated dispatcher provides a mechanism which allows processors to be self scheduling. The integrated dispatching process runs in a processor to choose which process will run next in this processor. That is, there is not a supreme, supervisory dispatcher which allocates processes to specific processors.

The entities scheduled by the integrated dispatcher need not be homogeneous. That is, the integrated dispatcher chooses what entity will run next in this processor based on the common criterion of priority, regardless of type. In the preferred embodiment, the types of entities which can be scheduled are the iprocs, mprocs, and procs as described hereinafter.

The integrated dispatcher provides the method to efficient multithread scheduling. That is, mechanisms have been added which will allow all processors to run simultaneously running the integrated dispatcher with limited chance of conflict. If each processor has selected a process of a different priority, each passes through the scheduler unaware that other processors are also dispatching. If two processes have the same priority, they are processed in a pipeline fashion as described hereinafter.

No new hardware is needed to support this invention. The mechanism referred to above is preferably the software synchronization mechanisms employed to allow simultaneous execution of specific pieces of code without endangering the integrity of the system.

The present invention is best suited for scheduling tightly coupled processors and works best if the hardware provides convenient locking mechanisms on memory access as described in U.S. Pat. No. 5,168,547, issued on Dec. 1, 1992. However, the application of this scheduling method is not restricted to this situation and can be used all or in part in a facility requiring efficient processor scheduling.

Those having normal skill in the art will recognize the foregoing and other objects, features, advantages, and applications of the present invention from the following more detailed description of the preferred embodiments as illustrated in the accompanying drawings.

DESCRIPTION OF THE PREFERRED EMBODIMENT

Figure 1:
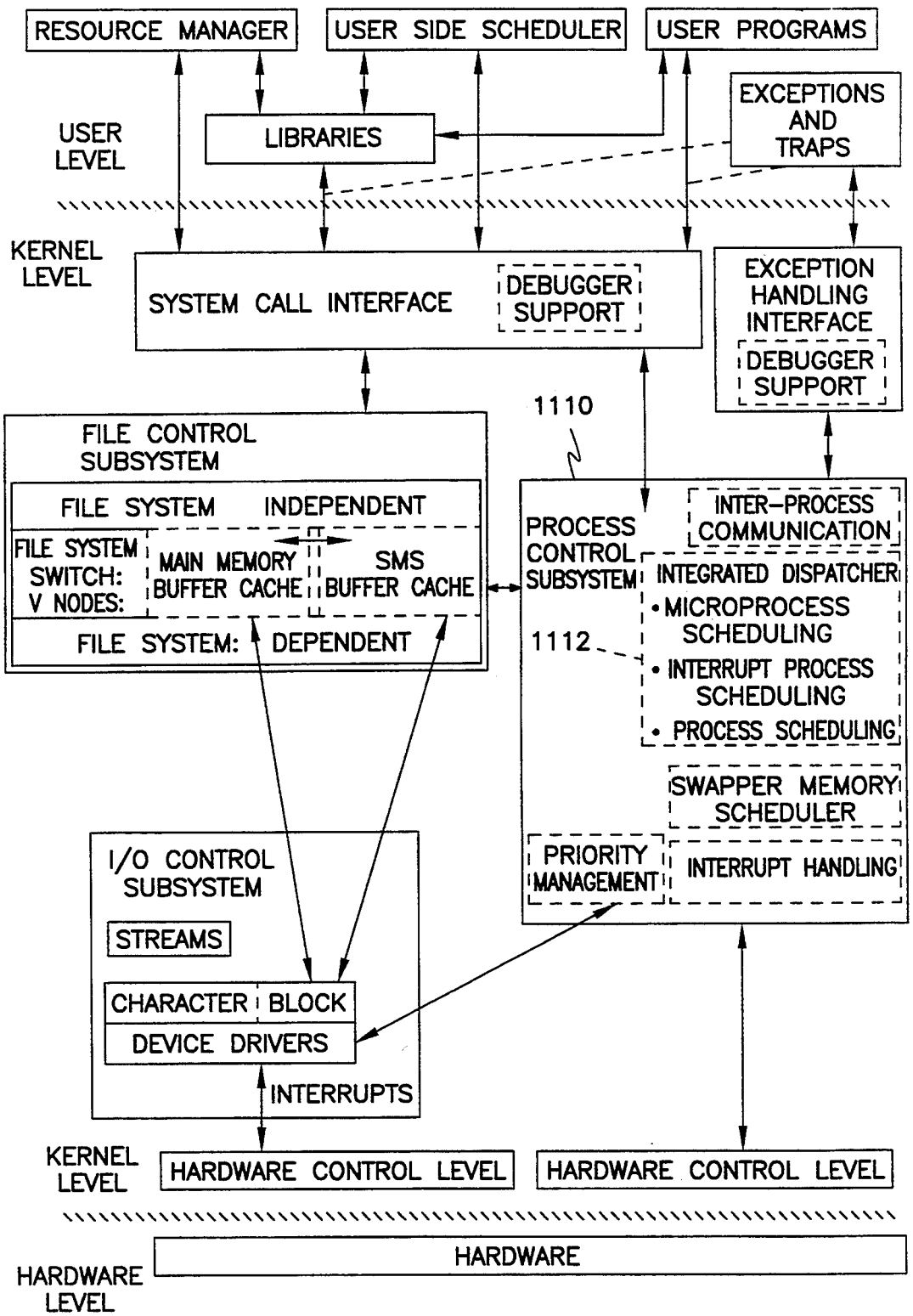
FIG. 1 is a schematic diagram showing the relationship of the integrated dispatcher to other parts of the operating system kernel.

The process control subsystem 1110 of the preferred embodiment is shown within the context of the Unix kernel in FIG. 1. The integrated dispatcher 1112 integrates the scheduling of microprocesses, interrupts, processes, and standard Unix processes.

Figure 2:
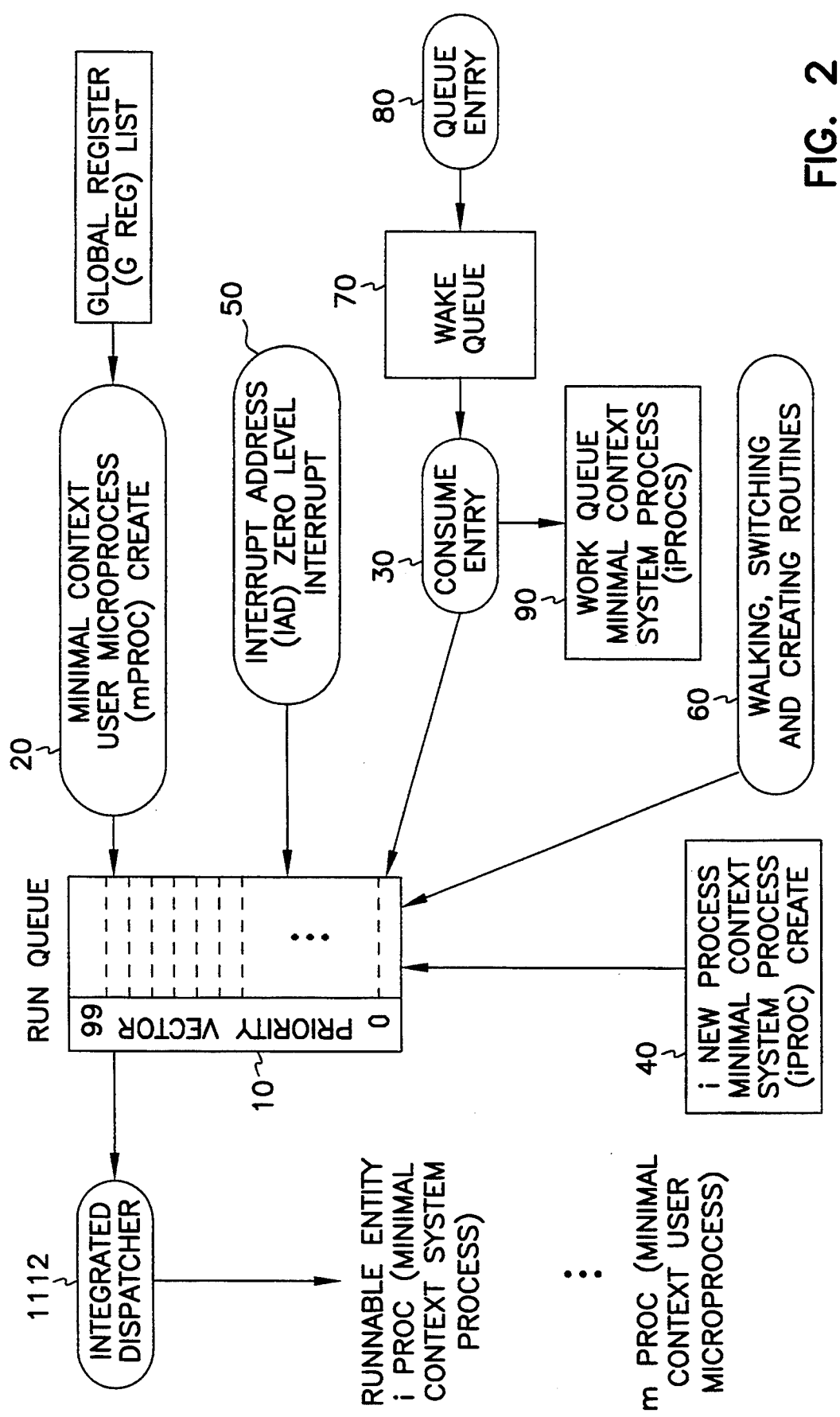
FIG. 2 is a block diagram relating the integrated dispatcher, run queue, wake queue, and process entity scheme.

In the preferred embodiment as illustrated in FIG. 2, the integrated dispatcher 1112 runs on a system of tightly coupled multiprocessors with hardware support for locking memory on a per word basis. This hardware mechanism is described in copending application METHOD AND APPARATUS FOR A LOAD AND FLAG INSTRUCTIOIN, Ser. No. 08/173,923, filed on Dec. 28, 1993 which is a file wrapper continuation of Ser. No. 07/920,155, filed on Jul. 23, 1992, now abandoned, which is a file wrapper continuation of Ser. No. 07/536,217, filed on Jun. 11, 1990, now abandoned. The integrated dispatcher is multithreaded. This means that all processors can be executing the integrated dispatcher simultaneously.

The integrated dispatcher is multithreaded to allow processors to simultaneously execute the dispatching code with minimal blocking. That is, all other processors should not be blocked until one processor completes dispatching. This created a bottleneck and is extremely inefficient. Instead, the present invention uses software synchronization methods to protect common data structures while allowing all processors to continue. Until processors contest for a specific common data structure, they will continue unimpeded. If a processor does attempt to access a protected structure, it will be blocked until the processor that locked the structure is finished with it. The data structures are set up to minimize these instances of blockage. For instance, if every processor simultaneously attempts to dispatch at a different priority, each will access a unique protectable structure allowing each to continue without being blocked.

An idle processor runs the integrated dispatcher, which selects the highest priority process from the run queue 10 (FIG. 2) and starts running the process. Contention for run queue entries is reduced because the dispatcher locks only the entries it currently is looking at. Entries on the run queue are also locked when new processes are put on the run queue 10 by mproc create 20, by consume entry 30, by Zero-level interrupt 50, by inewproc 40, and by the usual Unix scheduling means (waking, switching, and creating routines) 60.

An mproc is a kernel representation of a microprocess. Microprocesses are minimal context user processes designed to run very specific tasks very efficiently. That is, they are expected to be short lived. Microprocesses share a process image and user area making them very lean and efficient to create, but doing so also prevents them from switching because they do not have the unique context save areas that full processes do.

Figure 4:
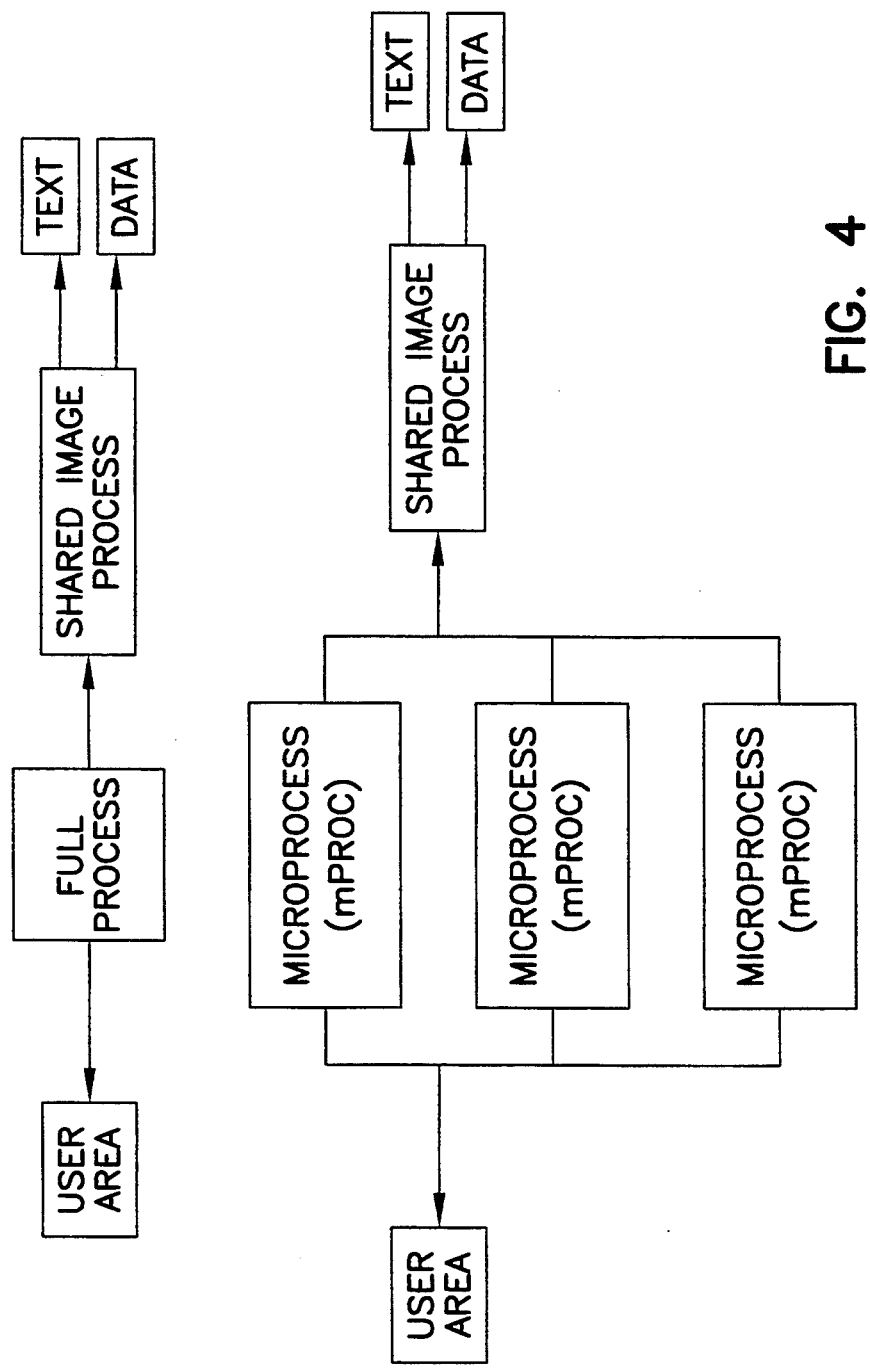
FIG. 4 is a comparative diagram between a full process and several microprocesses.

Each full process has a unique area and shared image process entry. The shared image process table entry contains information relevant to maintaining the segments which comprise the image. When a full process switches out (yields the processor to another process), it must save the state of the processor so that the same state can be restored before ressuming execution of the process. Microprocesses do not have unique context save areas (full process fields and user area structure) in which to store the processor state so they are expected to run to completion rather than yield the processor on the assumption they will resume at a later time. FIG. 4 illustrates an organizational comparison between a full process and microprocesses.

The copending application DUAL LEVEL SCHEDULING OF PROCESSES TO MULTIPLE PARALLEL REGIONS OF A MULTITHREADED PROGRAM ON A TIGHTLY COUPLED MULTI-PROCESSOR COMPUTER SYSTEM, U.S. Pat. No. 5,339,415, issued on Aug. 16, 1994, describes of the mproc method. The copending application METHOD OF EFFICIENT COMMUNICATION BETWEEN COPROCESSORS OF UNEQUAL SPEEDS, U.S. Pat. No. 5,202,988, issued on Apr. 13, 1993, describes the consume entry method.

An iproc is a minimal context process designed to efficiently execute kernel functions. The kernel procedure that creates these minimal context processes is called inewproc. It is a very simplified version of newproc which creates full processes.

A full process has both system context and user context. Kernel functions do not need their user context so allocating a full process context process to execute these functions is inefficient. A subset of a full process is allocated which allows the kernel function to execute. It does not have a user area or shared image process entry since it will not be executing user code. These functions are then very efficiently switched in and out since they depend on very little context. What little context they do depend on is saved in the iproc table entry. The copending application METHOD OF IMPLEMENTING KERNEL FUNCTIONS USING MINIMAL CONTEXT PROCESSES, U.S. Pat. No. 5,390,329, issued on Feb. 14, 1995, describes the inewproc method.

The run queue 10 resides in main memory and is equally accessible by all processors. Each processor runs the integrated dispatcher when the current process exits, when the current process waits for an event, or when the current process allows itself to be preempted. The integrated dispatcher can then cause a new process to be scheduled into the processor.

Figure 3:
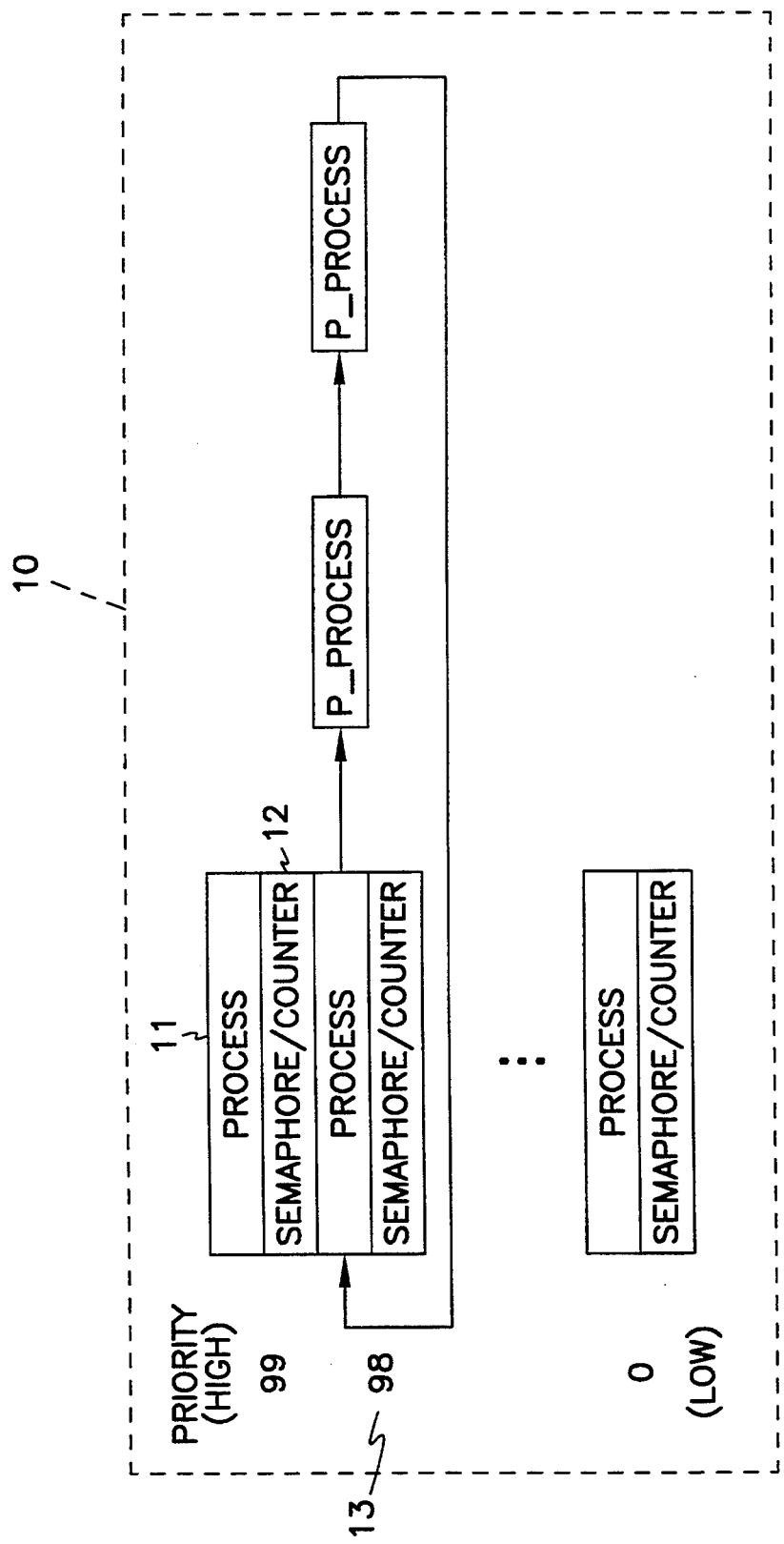
FIG. 3 is a diagram of the run queue with pipelined priority.

FIG. 3 shows the run queue data structure 10. The integrated dispatcher schedules all entities through the run queue. Entities with the highest priority on the run queue 11 are dispatched first. A semaphore counter 12 on each entry prevents multiple processes from accessing the same run queue entry simultaneously. If more than one entity has the same priority 13, the remaining entities remain in the run queue until their turn to be processed. The result is a first-in-first-out queue for each priority. The semaphore is released after the processor pulls off the process, allowing another processor to pull an entry off that queue. This pipeline for each priority keeps processes flowing quickly to processors.

Counting semaphores are software mechanisms for synchronization. The semaphore consists of a count of the available resources to be managed and a list associated with entities waiting for that resource. To implement a lock, this count is set to one so that only one resource, the lock, exists. If the semaphore is going to govern multiple resources, it is set to the number of resources available. As a resource is taken, this count is decremented. When the semaphore count goes to zero, no more resources are available so the requester is put to sleep to wait for one to become available. As a process flees a resource, it increments the semaphore counter and wakes up a waiting process.

In the case of the run queue, a process acquires the 'lock' on the entry associated with a specific priority and is then free to access the processes queued at this priority. All other processes will be blocked at the lock and are prevented from accessing the queued processes until the first process is finished with them and frees the lock. Once the lock is acquired the dispatching process can pop a process off of the run queue for execution. If multiple processes are queued at this priority, the rest remain on queue for an ensuing dispatching process to dequeue once it obtains the lock. An long as dispatching processes are accessing the run queue at different priorities, they will not block each other. They can run concurrently and share the dispatcher.

There is only one 'priority vector'. It is the run queue itself. That is, the priority is actually the index into the run queue array. Each entry on the run queue array consists of a semaphore and the head of the list of processes waiting execution at this priority. The list of processes is actually a linked list of the actual iproc, mpoc, and proc table entries. That is, the run threads through fields in the iproc, mproc, and proc table entries.

In the preferred embodiment, the integrated dispatcher schedules all activities which require a processor. These activities include iprocs, mprocs, processes, and events from external coprocessors via the wake queue 70 (FIG. 2). In the preferred embodiment, the integrated dispatcher provides a single focal point for scheduling multiple process types to multiple processors. The integrated dispatcher provides a means for all processors to access all processes. As each processor accesses the run queue 10, the dispatcher schedules the highest priority item on the queue independent of its category.

The integrated dispatcher uses a common run queue 10 designed as a vector of first-in-first-out queues. This scheme facilitates implementing the integrated dispatcher as a pipeline to eliminate the bottleneck for dispatching processes and is thus designed for efficient multiprocessor scheduling. The integrated dispatcher is completely symmetric with no preferential processors or processes and is therefore completely multithreaded.

Completely symmetric refers to the equalness of all processors and schedulable entities. That is, no processors are given preference nor is any process type ([im]-proc) given preference. Each processor has an equal chance of obtaining the entry lock and therefore being allowed to access a process to schedule. Processes are queued onto a run queue entry based solely upon their priority without biasing on account of their type iproc, mproc, or proc and are ordered on the queue in-first a first-in, first-out order.

This makes the dispatcher completely multithreaded because each processor is 'self-scheduling'. That is, there is not a processor dedicated to supervising the dispatching of processes to processors. Each processor works through the dispatching code when it needs to dispatch a process to run.

This organization also maintains symmetry by having a single focal point for dispatching rather than having multiple dispatchers per schedulable entity type inproc, mproc, or proc. If there were multiple dispatchers per type, this symmetry could not be maintained since one dispatcher would have to be checked before another, thereby giving that process type preference. That is, given an iproc dispatcher, an mproc dispatcher, and a proc dispatcher and given entries of equal priority on each, the dispatcher that is checked first actually has an inappropriately higher priority value since its entity is always chosen to run prior to the others having the same priority but on the queue of another dispatcher.

As the dispatching mechanism for the run queue, the integrated dispatcher handles the various system process entities (iproc, mproc, proc, and so on) that are implemented in the preferred embodiment using standard multithreading methods. The run queue is protected by means well known in the art of creating multithreaded code and described in the application INTEGRATED SOFTWARE ARCHITECTURE FOR A HIGHLY PARALLEL MULTIPROCESSOR SYSTEM, U.S. Pat. No. 5,179,702, issued on Jan. 12, 1993.

In the preferred embodiment, the conditional switch capability of the invention enables lower priority processes to handle interrupts rather than delaying high priority processes.

Switching means 'yielding the processor'. The current state of context of the processor must be saved somewhere so that it can be restored before it is allowed to resume. After the processor context is stored away (usually in the process user area) the context of the process to run next in the processor is restored. When the switched out process to run again, its processor context is restored so that the processor is in the same state it was before it switched out. processes do not have to resume on the processor from which it was switched. Any processor running the dispatching code and determining this process as the highest priority process will acquire this process context for execution.

Switching causes dispatcher code execution to choose the next process which should run on this processor. Therefore, the normal sequence of exents is: save outgoing processes context; run dispatcher to choose next process to run in this processor; restore context of chosen process; allow chosen process to resume execution.

Conditional switching is a more efficient version of this scheme that takes into account that a process may be experiencing preemption and not voluntarily giving up the processor because it is waiting for a certain event to happen (sleep). Conditional switching delays saving the current process's context until it is to be switched out. That is, if the process which was just switched out is the highest priority process on the run queue, it is chosen as the 'next process' to run on this processor. This results in an unnecessary saving and restoring of context. Therefore, the sequence for conditional switching is: determine highest priority process on run queue; compare this priority with the priority of current process; if current process is at an equal or higher priority, do not continue switching but allow current process to continue to execute; if current process is at a lower priority, continue with context switch, save current process's context, restore higher priority process's context and allow the latter process to resume execution.

A 'daemon' is a process that does not terminate. Once created, it performs a specific task and then goes to sleep waiting for that task to be needed again. These tasks are frequently repeated making it much more efficient to keep the process rather than to create it each time its function is needed. An example of a daemon in UNIX is the buffer cache daemon which is created at system boot time and awakened whenever the buffer cache needs to be flushed out to disk.

There may exist a minimal-context system daemon which any processor can wake to handle the interrupt, or any processor may create a new minimal context system process to handle it. Either way, the interrupted processor's running need not be delayed by handling the interrupt itself. When the integrated dispatcher runs it will schedule the highest priority process. Therefore, if the newly created or awakened interrupt process is the highest priority process, it is chosen to run. Note that the concept of a lightweight system process is essential to this scheme because interrupt handling can not be delayed while a full context process is created to handle the interrupt. This allows a processor running a high priority process to cause a processor running a lower priority to handle the interrupt. A lightweight system process typically is an iproc in contrast to a microprocess which is an mproc, both of which were discussed hereinabove.

If it is imperative that an interrupt be handled immediately, the current processor can cause another processor to be preempted by sending that processor a signal (see application SIGNALING MECHANISM FOR A MULTIPROCESSOR SYSTEM, U.S. Pat. No. 5,239,629, issued on Aug. 24, 1993). The signalled processor, 5 process is preempted when it receives the signal. The process running on the signalled processor can then determine whether it will handle the interrupt; if the iproc assigned to handle the interrupt is at a higher priority than the process being executed, the current process will be switched out and the iproc run.

A system variable identifies processor number that is currently executing at the lowest priority. Given this identification, any processor can signal any other processor as provided by the hardware in the last mentioned copending patent application. Assuming such machine hardware exists, a processor receiving an interrupt can creates an iproc to handle that interrupt and then signal the lowest priority processor. The interrupted processor then resumes execution of its process without servicing the interrupt. Receipt of the signal, by the lowest priority processor forces it into the interrupt mode and conditional switching. This 'lowest priority process' may not actually be at a lower priority than the newly created iproc which is servicing the interrupt. That is, if all the processors were executing higher priority tasks at the time of the interrupt, the 'west priority' process currently executing may be at a higher priority than the iproc. In this case, the conditional switch allows the latter processor to continue to executing its current process instead of servicing the interrupt. The interrupt is serviced when a processor drops to a priority below that of the iproc.

The problem of overhead on system processes has been eliminated, or at least substantially minimized, by the method provided in if the preferred embodiment that creates the special process entities which are nearly context free. The dispatcher has a mechanism for generating minimal context system processes as described in the copending application METHOD OF IMPLEMENTING KERNEL FUNCTIONS USING MINIMAL CONTEXT PROCESSES, U.S. Pat. No. 5,202,988, issued on Feb. 14, 1995.

A 'user block' or 'user area' is a data structure used by the kernel to save information related to a process that is not needed until the process is ready to run. That is, the kernel keeps data related to a process in process table entries and in user areas. All information needed, regardless of the state of the process, is in the process table. The user area can actually be swapped and must therefore not contain any information the system may need while it is not in memory. In the preferred embodiment, the user block is eliminated completely, and the information contained in the process table is minimized. The overall result is that overhead is minimized.

The integrated dispatcher addresses yet another limitation of prior implementations. The dispatcher runs in conjunction with a mechanism which allows slower coprocessors to schedule work in the multiprocessor as described below as well as in copending application METHOD OF EFFICIENT COMMUNICATION BETWEEN COPROCESSORS WITH UNEQUAL SPEEDS, U.S. Pat. No. 5,202,988, issued on Apr. 13, 1993.

The integrated dispatcher contains the intelligence for managing the wake queue 70. The wake queue is a method of communication between slow and fast processes which prevents impeding the fast processes. Access to the wake queue occurs in such a way as to permit slower coprocessors to put entries on the wake queue without holding up the faster processors. Thus, coprocessors of unequal speeds can efficiently schedule tasks for a fast processor to run without locking the run queue from which the fast processors are scheduled.

For example, when a peripheral device which is slow requests action from a processor which is fast, the request is held in the wake queue until a processor is available to handle the request. Thus, faster processors are not impeded by slower coprocessors.

The intelligence for servicing the wake queue has been added to the integrated dispatcher. Rather than having a slow coprocessor interrupt a fast processor to schedule a task to indicate that some tasks are complete, the wake queue concept provides an intermediate queue upon which the coprocessor can queue information. When the integrated dispatcher is run, it determines whether any entries are in the wake queues and, if so, processes them. This processing varies widely depending on the data queued. Any information can be queued and processed in this way as long as the coprocessor con to queue it, and the intelligence is added in the integrated dispatcher to process it. For example, if the information queued is simply the address of a process waiting for some coprocessor task to be completed, the integrated dispatcher can awake the addressed process. This results in that process being queued on the run queue. Specific details of the wake queue are described in the copending application METHOD OF EFFICIENT COMMUNICATION BETWEEN COPROCESSORS WITH UNEQUAL SPEEDS.

While the preferred embodiments of the present invention are described herein with particularity, those having ordinary skill in the art will recognize various changes, modifications, additions and applications other than those specifically mentioned herein without departing from the spirit of this invention.

What is claimed is:

1. A system for providing self-scheduling by each of a plurality of processors for executing a multiplicity of types of processes comprising:

memory means accessible by said plurality of processors:

run queue means stored as an array in said memory means for making available to the plurality of processors context for several types of processes to be executed by the plurality of processors and indexed by order of priority;

integrated dispatcher means stored as a sequence of processor executable instructions in the memory means for assigning processes to available ones of the plurality of processors in response to execution by available processors, said integrated dispatcher means including means for accessing by an index representing the highest priority process in the run queue means independent from process type a process to be run by an available processor of the plurality of processors, and means coupled to the accessing means or transferring context of an accessed process from the run queue means to an available one of the plurality of processors;

indicating means for identifying the lowest priority current process being executed and which processor of the plurality of processors is executing the lowest priority current process;

interrupt receiving means responsive to interrupt request signals and the indicating means for comparing the priority of an interrupting process with that of the lowest priority current process; and conditional switching means coupled to the interrupt receiving means for switching context of the interrupting process with the context of the lowest priority current process and storing the context of the lowest priority current process in the run queue means if the priority of the interrupting process is higher than that of the lowest priority current process and otherwise storing the context of the interrupting process in the run queue means.

2. The combination claimed in claim 1 further including:

wake queue means stored as a list of addresses in the memory means for identifying locations of processes not in the run queue and wherein the integrated dispatcher means includes means for fetching addresses from the wake queue, and means for moving context of processes from locations at fetched addresses to the run queue.

3. The combination claimed in claim 1 wherein the integrated dispatcher means further comprises blocking means responsive to an addressing means of the memory means for preventing access by one processor to context being transferred to another processor.

4. The combination claimed in claim 1 wherein the integrated dispatcher means includes:

semaphore means for indicating a count of available processes in the run queue means;

means for incrementing the count when a process is added to the run queue;

means for decrementing the count when a process is transferred out of the run queue; and means responsive to a zero count value for precluding access to the integrated dispatcher means by an available processor.

* * * * *